United States Patent
Tonutti (10) Patent No.: US 7,076,938 B2
(45) Date of Patent: Jul. 18, 2006

(54) PIVOTING INNERMOST RAKE WHEEL SYSTEM FOR VARYING WINDROW WIDTH

(75) Inventor: Carletto Tonutti, Udine (IT)

(73) Assignee: Tonutti S.p.A., Remanzacco (IT)

( * ) Notice: Subject to any disclaimer, the term of this patent is extended or adjusted under 35 U.S.C. 154(b) by 0 days.

(21) Appl. No.: 11/001,106

(22) Filed: Dec. 1, 2004

(65) Prior Publication Data

US 2005/0076630 A1    Apr. 14, 2005

Related U.S. Application Data

(62) Division of application No. 10/472,541, filed as application No. PCT/IB02/02617 on Mar. 28, 2002.

(60) Provisional application No. 60/332,894, filed on Nov. 16, 2001, provisional application No. 60/279,268, filed on Mar. 28, 2001.

(51) Int. Cl.
*A01D 76/00* (2006.01)
*A01D 78/00* (2006.01)
*A01D 80/00* (2006.01)
*A01D 84/00* (2006.01)

(52) U.S. Cl. .......................... 56/370; 56/377

(58) Field of Classification Search ............... 56/370, 56/375, 376, 377, 378, 379, 380, 384, 385, 56/396, 397, 399, 400, DIG. 21
See application file for complete search history.

(56) References Cited

U.S. PATENT DOCUMENTS

| | | | | |
|---|---|---|---|---|
| 2,977,743 A | * | 4/1961 | Giles | 56/377 |
| 4,077,189 A | * | 3/1978 | Hering | 56/11.9 |
| 4,753,063 A | * | 6/1988 | Buck | 56/377 |

(Continued)

FOREIGN PATENT DOCUMENTS

AU    75 455/81    3/1982

(Continued)

*Primary Examiner*—Árpád Fábián Kovács
(74) *Attorney, Agent, or Firm*—Boyle, Fredrickson, Newholm, Stein & Gratz, S.C.

(57) ABSTRACT

A bifold rake for agricultural crop material includes a rear wheeled trolley and a forwardly extending drawbar adapted for interconnection with a tow vehicle such as a tractor. A pair of rake arms are pivotably interconnected to opposite sides of the trolley, and each rake arm carries a series of rake members such as rotatable rake wheels. An opening and closing mechanism is interposed between the drawbar and the rake arms, for moving the rake arms between open and closed positions. The rake includes a windrow width adjustment system for adjusting the width of a windrow of crop material formed by the rake, independent of adjustment in the width of the trolley. In one embodiment, the windrow width adjustment system is in the form of a variable position connection arrangement interposed between each rake arm and the trolley, for adjusting the lateral position of the rearward end of the rake arm so as to adjust the position of the innermost rake member. The variable position connection arrangement includes a transversely extending guide rod located on each side of the trolley, with a slidable engagement connection between the guide rod and the rearward end of the rake arm. An actuator, such as a rotatable screw assembly, is interconnected with the bracket arrangement for moving the bracket arrangement on the guide rod, to alter the position of the rearward end of the rake arm to adjust the position of the rearwardmost rake member. In another embodiment, each innermost rake member is interconnected with its respective rake arm via an angularly adjustable connection arrangement, which enables the innermost rake members to be pivoted toward and away from each other to adjust the windrow width.

9 Claims, 8 Drawing Sheets

U.S. PATENT DOCUMENTS

| | | | |
|---|---|---|---|
| 4,864,809 A * | 9/1989 | van der Lely et al. | 56/377 |
| 5,062,260 A | 11/1991 | Tonutti | |
| 5,065,570 A * | 11/1991 | Kuehn | 56/377 |
| 5,305,590 A | 4/1994 | Peeters | |
| 5,598,691 A | 2/1997 | Peeters | |
| 5,685,135 A | 11/1997 | Menichetti | |
| 5,752,375 A | 5/1998 | Tonutti | |
| 5,918,452 A | 7/1999 | Kelderman | |
| 5,956,934 A | 9/1999 | Wright et al. | |
| 5,966,916 A * | 10/1999 | Laing | 56/377 |
| 6,314,710 B1 * | 11/2001 | Tonutti | 56/378 |
| 6,543,212 B1 * | 4/2003 | Tonutti | 56/375 |

FOREIGN PATENT DOCUMENTS

| | | | |
|---|---|---|---|
| DE | 3521341 | * | 12/1986 |

* cited by examiner

PIVOTING INNERMOST RAKE WHEEL SYSTEM FOR VARYING WINDROW WIDTH

CROSS-REFERENCE TO RELATED APPLICATION

This application is a divisional of application Ser. No. 10/472,541 filed Sep. 18, 2003, which is a 371 of PCT/IB02/02617 filed Mar. 28, 2002 which claims benefit of U.S. Ser. No. 60/279,268 filed Mar. 28, 2001 and claims benefit of U.S. Ser. No. 60/332,894 filed Nov. 16, 2001.

BACKGROUND AND SUMMARY OF THE INVENTION

This invention relates to a bifold or V-type rake, and more particularly to a system for adjusting the width of a windrow of crop material formed by a rake of this type.

A bifold or V-type rake typically includes a rear wheeled trolley or frame assembly, located at the rearward end of a drawbar which is adapted for connection to a tow vehicle such as a tractor. A pair of rake arms are pivotably mounted at their rearward ends to opposite sides of the trolley. Each rake arm carries a series of rake members such as rotatable rake wheels, which are operable to rake crop material inwardly as the rake is moved along the ground to form a windrow of crop material. The rake arms are typically pivotable relative to the trolley between an inoperative closed position for transport or storage, and an operative open position for use in raking crop material to form a windrow.

In a conventional construction, the space between the rearwardmost rake members defines the width of the windrow formed by the rake as the rake is moved along the ground. In order to vary the width of the windrow, it is known in the prior art to provide a variable width construction for the trolley. This approach provides adjustment in the spacing between the rearwardmost rake members so as to adjust the windrow width, but involves certain drawbacks in that the variable width construction of the trolley detracts from the overall strength and durability of the trolley. Further, in some versions, it is incumbent upon the operator to ensure that the adjustable components of the trolley are properly positioned and securely connected together prior to use, which introduces the possibility of operator error.

It is an object of the present invention to provide a bifold or V-type rake in which the width of the windrow formed by the rake can be adjusted without the need to alter the width of the trolley or to otherwise manipulate the trolley in order to adjust windrow width. It is a further object of the invention to provide such a rake in which windrow width can be quickly and easily adjusted by an operator. Yet another object of the invention is to provide such a rake in which the windrow width can be adjusted to any desired width within a wide range of possible windrow widths. It is a further object of the invention to provide such a rake in which the windrow width adjustment system can be incorporated into a rake having similar components as in the prior art, with minor modifications to the overall construction of the rake. A still further object of the invention is to provide such a rake in which the windrow width adjustment system is relatively simple in its components and construction, yet which provides a highly satisfactory arrangement for adjusting windrow width.

In accordance with the present invention, a V-rake incorporating a windrow width adjustment mechanism generally includes a rear wheeled trolley in combination with a pair of rake arms having a series of rake members, and a drawbar that extends forwardly from the trolley for interconnection with a tow vehicle. Each rake arm includes an innermost rake member which functions to define the windrow width as the rake is moved along the ground. The rake incorporates a windrow width adjustment mechanism which is operable to enable movement of the innermost rake members toward and away from each other to adjust the windrow width, independent of the trolley and without altering the overall width of the trolley.

In accordance with one embodiment of the present invention, the windrow width adjustment system is in the form of a variable position connection arrangement interposed between the trolley and each rake arm. Each variable position connection arrangement includes a bracket to which the rake arm is mounted for movement about a pivot axis for enabling the rake arm to be moved between its open and closed positions. The bracket is engaged with a position adjustment mechanism which in turn is secured to one side of the trolley, and which is operable to adjust the lateral position of the bracket, and thereby the rearward end of the rake arm and the innermost rake member, relative to the trolley.

In one form, the position adjustment mechanism includes a frame secured to the trolley, and one or more axial guide rods secured to the frame and extending in a direction parallel to a transverse axis along which the trolley extends. The bracket is slidably engaged with the one or more guide rods, and an actuator arrangement, such as a threaded actuator screw, is rotatably mounted to the frame and is interconnected with the bracket so as to move the bracket, and thereby the inner end of the rake arm secured to the bracket, along the one or more guide rods to adjust the position of the rearward end of the rake arm. The rake arm may be engaged with the bracket via a coupling member which provides pivoting movement of the rake arm about a horizontal pivot axis, to enable the rake arm to follow the contours of the ground during movement of the rake.

In another embodiment, the position adjustment mechanism is in the form of a frame which is pivotably engaged with the trolley for movement about a vertical pivot axis. The frame includes a transverse guide rod, which extends through a passage formed in the rearward end of the rake arm such that the rake arm is movable along an axis defined by the guide rod. An actuator member, such as a threaded screw, is rotatably mounted to the frame and extends along an axis parallel to the axis of the guide rod. The actuator screw is engaged with a support member that supports the rearward end of the rake arm, such that rotation of the actuator screw causes movement of the support member, and thereby the rearward end of the rake arm, along the guide rod. With this arrangement, the guide rod provides the dual function of guiding transverse movement of the rearward end of the rake arm during adjustment of windrow width, as well as forming a horizontal pivot axis for the rearward end of the rake arm. The pivoting connection of the frame to the trolley functions to relieve stresses which would otherwise be experienced by the position adjustment arrangement.

In accordance with another embodiment of the invention, each of the innermost rake members is mounted to one of the rake arms via an angularly adjustable connection. In this manner, the angle of each innermost rake member can be adjusted relative to its associated rake arm, to adjust the width of the windrow formed by the innermost rake members. The angularly adjustable connection includes a vertical axis pivot connection interconnected with the rake arm, and to which the rake member is engaged via a lifting and lowering arm. A lever extends from the vertical axis pivot connection in a direction opposite the lifting and lowering arm, and is interconnected with an actuating arrangement, such as a rotatable actuator screw rotatably mounted to the rake arm, for providing movement of the lever, and thereby the lifting and lowering arm. Operation of the actuator screw functions to pivot the lifting and lowering arm, and thereby the rake member, relative to the rake arm and the remainder of the rake members located forwardly of the innermost rake member. This adjustment in the angle of the innermost rake member relative to the remaining rake members functions to alter the width of the windrow formed by the innermost rake members, independent of the trolley width.

The invention also contemplates an improvement in a V-rake as well as a method of adjusting the width of a windrow formed by a V-rake, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIGS. 7 and 8 are top plan views of an alternative embodiment of a variable position connection arrangement for adjusting the position of the rake arm relative to the trolley, in accordance with the present invention, wherein FIG. 7 illustrates the rake arms in a position providing a maximum windrow width and FIG. 8 illustrates the rake arms in a position providing a minimum windrow width;

DETAILED DESCRIPTION OF THE INVENTION

Figure 1:
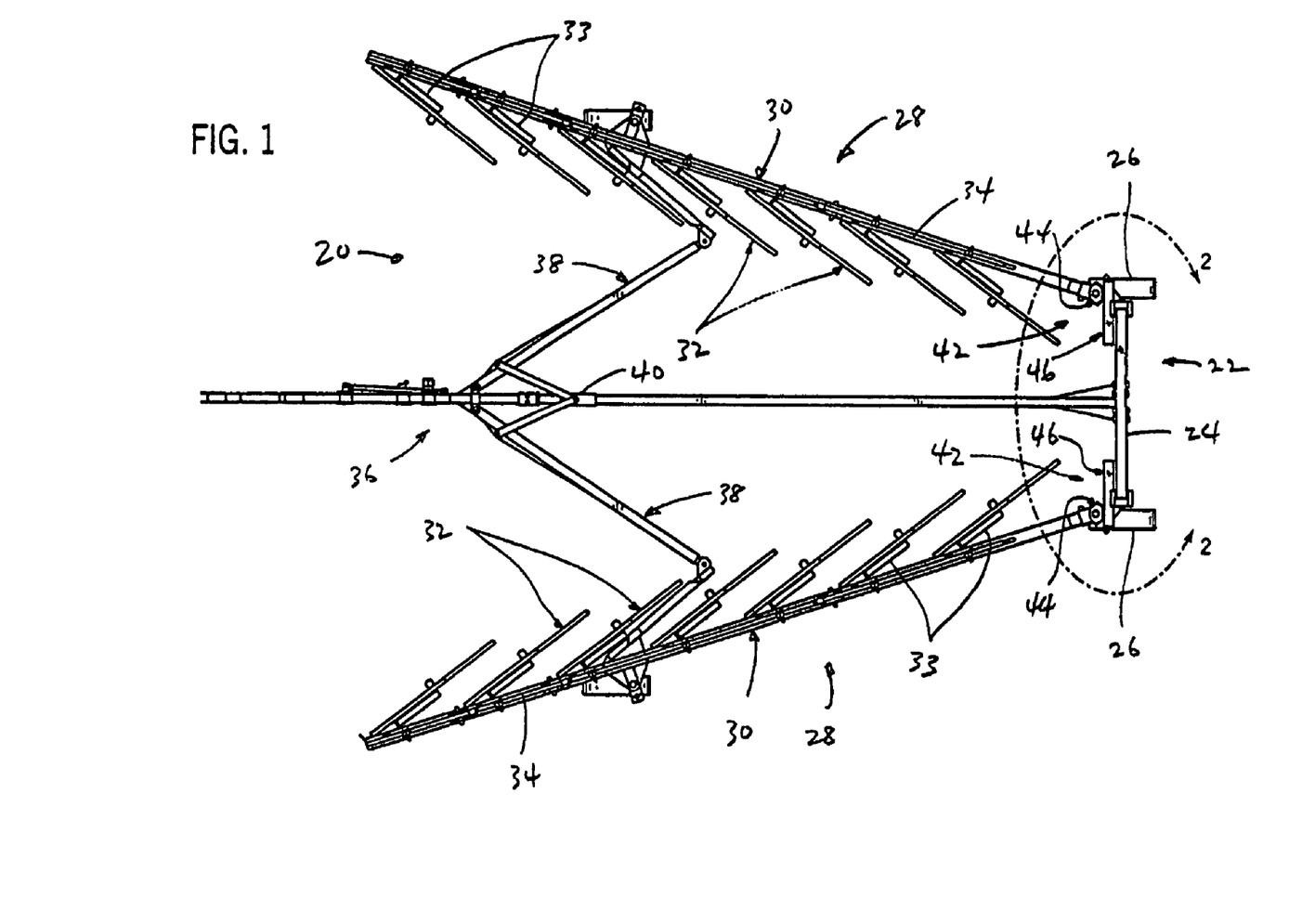
FIG. 1 is a top plan view of a bifold or V-type rake incorporating a first embodiment of a windrow width adjustment system in accordance with the present invention, in a position providing a maximum windrow width.
Figure 2:
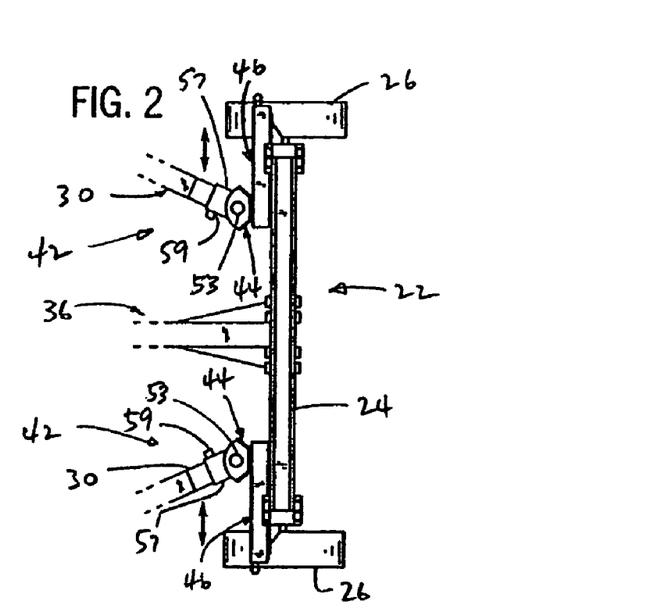
FIG. 2 is a partial top plan view of the rear portion of the rake of FIG. 1, with reference to line 2—2 of FIG. 1, showing the rake arms in a position providing a minimum windrow width.
Figures 3, 6:
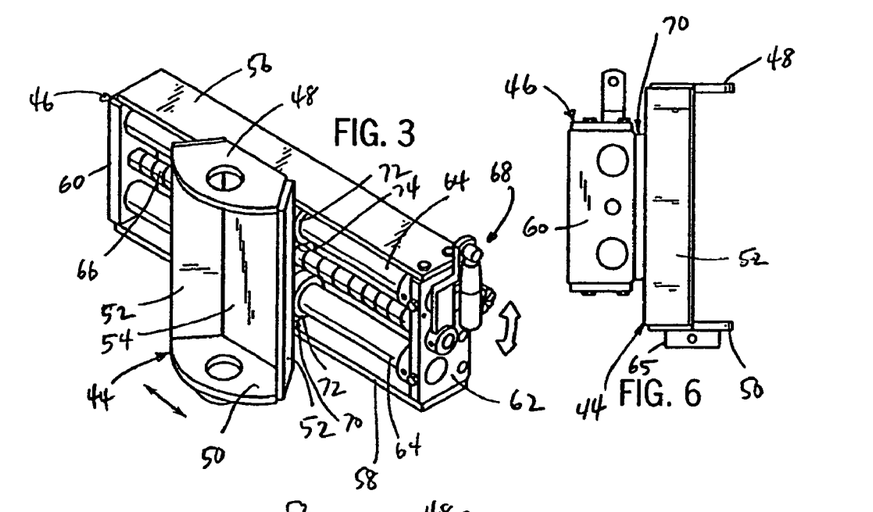
FIG. 3 is an isometric view of a variable position connection arrangement adapted to be interposed between each rake arm and the rear frame or trolley of the rake of FIG. 1, for providing an adjustable position connection of the rake arm to the rear frame or trolley so as to adjust windrow width.
FIG. 6 is an end elevation view of the variable position connection arrangement of FIGS. 3–5.
Figure 4:
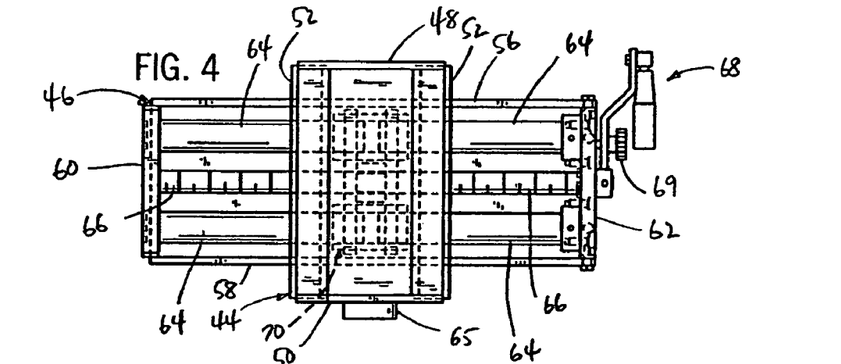
FIG. 4 is a front elevation view of the variable position connection arrangement of FIG. 3.
Figure 5:
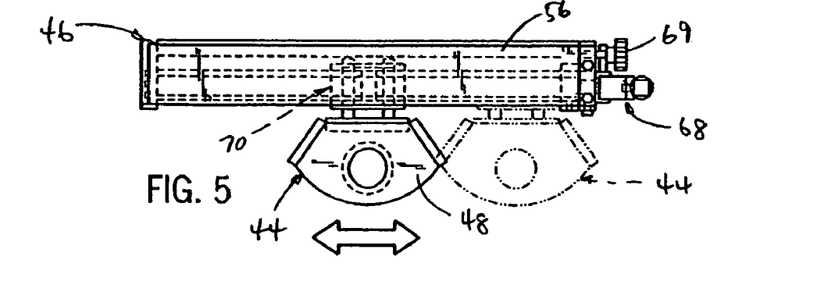
FIG. 5 is a top plan view of the variable position connection arrangement of FIGS. 3 and 4.
Figure 7:
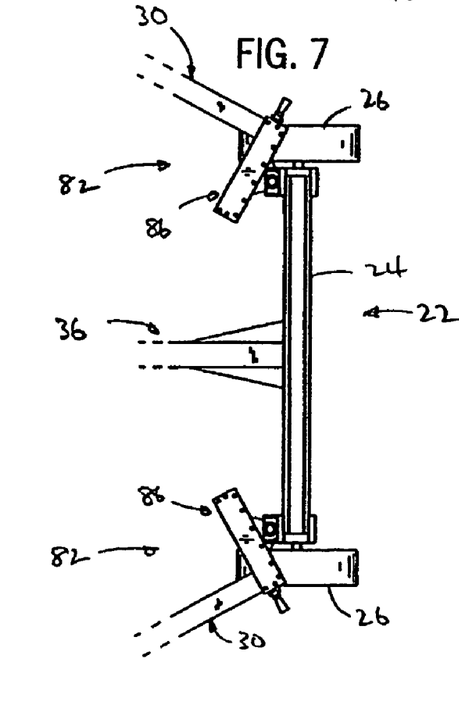
Figure 8:
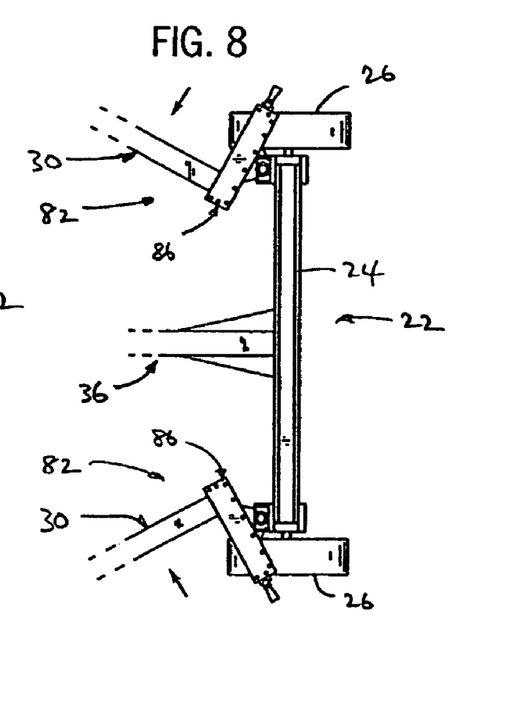

Referring to FIG. 1, a V-rake 20 includes a rear frame assembly or trolley 22 which has a transverse rear frame member 24 and a pair of wheels 26 mounted to the ends of rear frame member 24. A pair of rake arm assemblies 28 are pivotably mounted to rear frame assembly 22, such that each rake arm assembly 28 extends forwardly from one of the ends of rear frame member 24. Typically, trolley 22 includes a pair of vertical legs that extend downwardly from the opposite ends of frame member 24. Wheels 26 are mounted to the lower ends of the trolley legs, and rake arm assemblies 28 are mounted to the trolley legs above wheels 26 and below frame member 24.

Each rake arm assembly 28 includes a rake arm 30 that carries a series of rake wheel assemblies 32. Rake wheel assemblies 32 are of conventional construction, and each includes a pivot arm 33 that is pivotably mounted to rake arm 30, for providing movement of each rake wheel assembly 32 between a raised, inoperative position for transport and a lowered, operative position in which the rake wheel is engaged with the ground. In a manner as is known, an axially movable actuator rod 34 is mounted to each rake arm 30 for moving rake wheel assemblies between the raised and lower positions.

A drawbar assembly 36 is interconnected at its rearward end with transverse rear frame member 24, and is adapted for engagement with a tow vehicle such as a tractor for pulling V-rake 20 in a manner as is known. A conventional opening and closing mechanism, including a pair of arm assemblies 38 and a sleeve or slider member 40, is interposed between drawbar 36 and rake arm assemblies 28 for moving rake arm assemblies 28 between open and closed positions.

In accordance with the invention, the width of a windrow formed by V-rake 20 can be adjusted without altering the width of trolley 22. In a first embodiment of the invention, as illustrated I FIGS. 1–6, the windrow width is adjusted by varying the position of engagement between rake arms 30 and rear trolley or frame assembly 22. In this embodiment, an adjustable position rake arm mounting mechanism 42 is interposed between each rake arm 30 and rear frame assembly 22. Generally, each adjustable position rake arm mounting mechanism 42 includes a rake arm mounting bracket assembly 44 and an adjustment mechanism 46. The following description pertains to rake arm mounting mechanism 42 associated with one of rake arms 30, as illustrated in FIGS. 3–6, with the understanding that it applies equally to the other rake arm 30 in a mirror image fashion.

Mounting bracket assembly 44 includes upper and lower walls 48, 50, respectively, formed with vertically aligned openings. A pair of angled sidewalls 52 and a rear wall 54 extend between upper and lower walls 48, 50. The rear end of a rake arm 30 is located between upper and lower walls 48, 50, and a vertical pin 53 (FIG. 2) extends through the openings in upper and lower walls 48, 50 as well as through an aligned vertical passage defined by the rear end of rake arm 30. The lower end of pin 53 is received within a sleeve 65 mounted to lower wall 50. In this manner, rake arm 30 is pivotably mounted to mounting bracket assembly 44 for movement about a vertical pivot axis defined by the longitudinal axis of pin 53. Alternatively, the rear end of rake arm 30 may be engaged with a coupling member 57 (FIG. 2) through which pin 53 extends, and which includes a horizontal axis pivot connection 59 engaged with the rear end of rake arm 30.

As shown in FIGS. 3–6, adjustment mechanism 46 includes a frame assembly adapted to be mounted to one of the vertical legs of trolley 22. The frame assembly includes upper and lower parallel frame members 56, 58, respectively, and a pair of parallel side frame members 60, 62. A pair of tubular guide members 64 are fixed to and extend between side frame members 60, 62. A rotatable actuator screw 66 is rotatably mounted to and extends between side frame members 60, 62, and is oriented parallel to the longitudinal axes of guide members 64.

A crank-type handle assembly 68 is rotatably mounted to side frame member 62 and is fixed to the end of actuator screw 66. Handle assembly 68 is manually rotatable about the longitudinal axis of actuator screw 66, for imparting rotation to screw 66. A retainer screw 69 is interposed between handle assembly 68 and side frame member 62 for selectively maintaining handle assembly 68 in a retained position when not in use.

A slide block 70 is secured to rear wall 54 of mounting bracket assembly 44. Slide block 70 includes a pair of sleeves 72 that define transverse passages within which guide members 64 are received, such that slide block 70 is slidably movable on guide members 64. Slide block 70 further includes a threaded passage 74 through which actuator screw 66 extends, such that the external threads of actuator screw 66 are engaged with the internal threads of threaded passage 74. In this manner, rotation of actuator screw 66 causes slide block 70 to move on guide members 64 in a direction parallel to the longitudinal axes of actuator screw 66 and guide members 64.

In operation, the user turns handle assembly 68 so as to move slide block 70 along guide members 64, to adjust the position of mounting bracket assembly 44 on adjustment mechanism 46, between an outermost position (FIG. 1) providing a maximum windrow width and an innermost position (FIG. 2) providing a minimum windrow width. The amount of windrow width adjustment is determined by the length of guide members 64 and actuator screw 66, to provide any degree of adjustment as desired. With this arrangement, the user can adjust the position of one or the other of rake arms 30, but preferably adjusts the position of both rake arms 30 so as to be symmetrical about the longitudinal axis of rake 20 to reduce imbalances and possible skewing which could be caused by different positions of the rake arms relative to the rake centerline.

In a second embodiment illustrated in FIGS. 7–15, an adjustable position rake arm mounting mechanism 82 includes a support 84 secured to the inner end of rake arm 30, in combination with a pivotable adjustment mechanism 86 to which support 84 is mounted for lateral movement.

The following description pertains to pivotable adjustment mechanism 86 associated with one of rake arms 30, as illustrated in FIGS. 7–15, with the understanding that it applies equally to the other rake arm 30 in a mirror image fashion.

In this embodiment, each rake arm 30 is divided into a rear section 88 and a forward section 90, with a hinge 92 interposed between rear section 88 and front section 90. Hinge 92 includes a hinge pin defining a horizontal hinge axis, such that rear section 88 and forward section 90 can pivot vertically relative to each other, so as to closely follow the contours of the ground.

The rear end of rake arm rear section 88 includes a transverse passage 94 (FIG. 14), and is received within an internal open area defined by support 84, which in turn includes a pair of side walls 96 having aligned openings 98. Support 84 is adapted to be positioned such that openings 98 are placed into alignment with passage 94 in rake arm rear section 88. A bottom cross member 100 extends between and interconnects the lower ends of side walls 96, and a top cross member 102 extends between and interconnects the upper ends of side walls 96. A threaded sleeve 104 is secured to the upper surface of top cross member 102.

Figure 15:
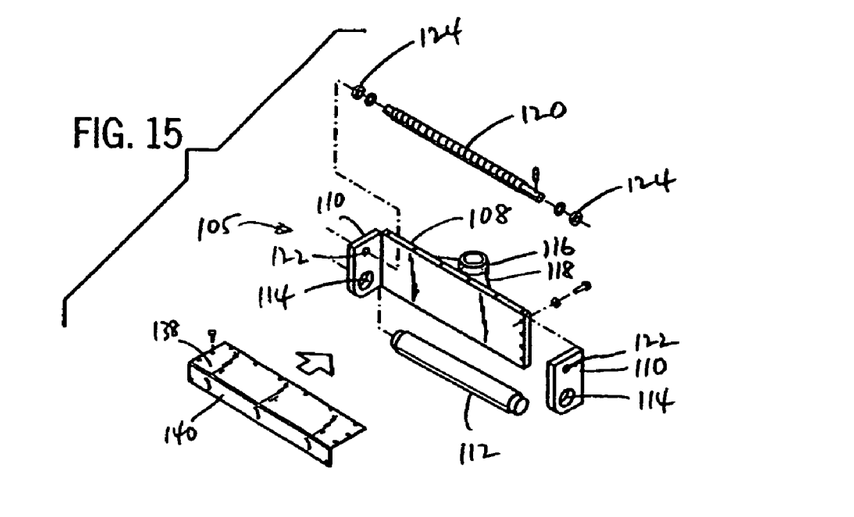
FIG. 15 is an exploded isometric view of a pivotable adjustment mechanism incorporated in the variable position connection arrangement of FIGS. 7 and 8.

Pivotable adjustment mechanism 86 further includes a frame assembly 105 which is pivotably mounted, in a manner to be explained, to the vertical leg, shown at 106, forming a part of the rear trolley 22 of rake 20, in a manner as is known. As shown in FIG. 15, frame assembly 105 of adjustment mechanism 86 includes a rear member, in the form of a rear plate 108, in combination with a pair of forwardly extending side members, in the form of side plates 110, which are secured at their rearward ends to the outer ends of rear plate 108. A guide rod 112 extends between side plates 110, and includes reduced diameter ends that are received within openings 114 formed in side plates 110.

An upright pivot sleeve 116 is secured to the rear surface of rear plate 108 by a pair of mounting brackets 118. Pivot sleeve 116 defines an upright pivot axis that is perpendicular to the longitudinal transverse axis of guide rod 112.

A laterally extending adjustment screw 120 extends between side plates 110, and is rotatably mounted within openings 122 formed in side plates 110. Adjustment screw 120 extends parallel to guide rod 112, and includes external threads along its length. The ends of adjustment screw 120 are received within bearings 124 mounted within side plate openings 122, to facilitate rotation of adjustment screw 120 relative to side plates 140.

Figures 9, 10, 12:
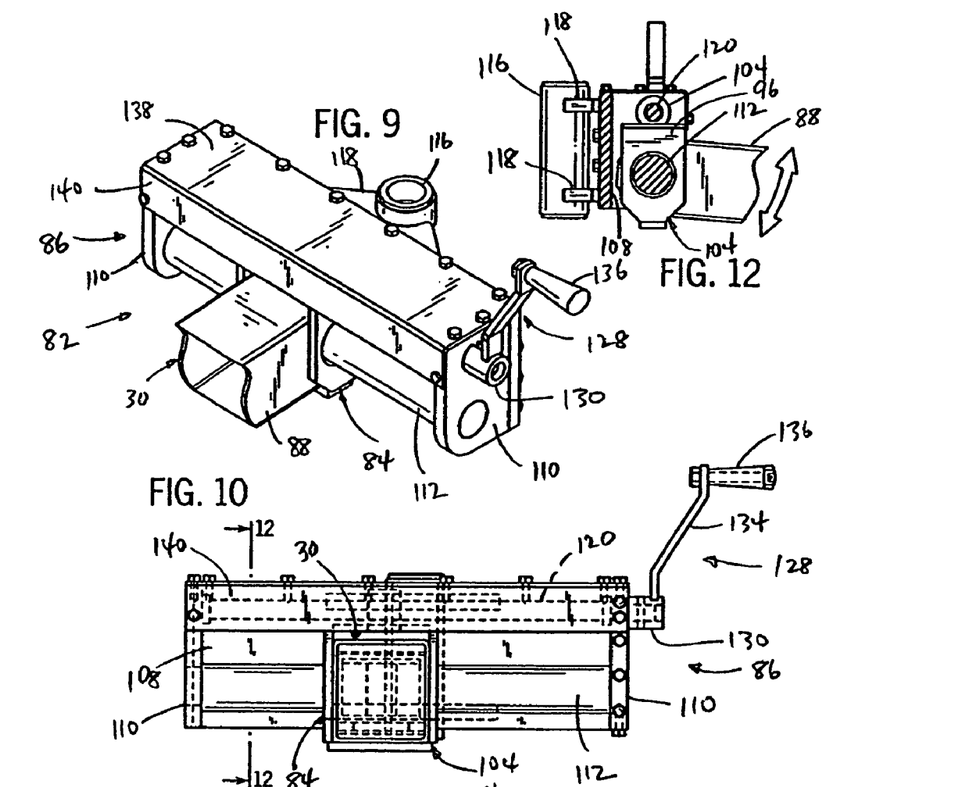
FIG. 9 is an isometric view illustrating the variable position connection arrangement interposed between the rake arms and the trolley of FIGS. 7 and 8.
FIG. 10 is a front elevation view of the variable position connection arrangement of FIG. 9.
FIG. 12 is a section view taken along line 12—12 of FIG. 10.
Figure 11:
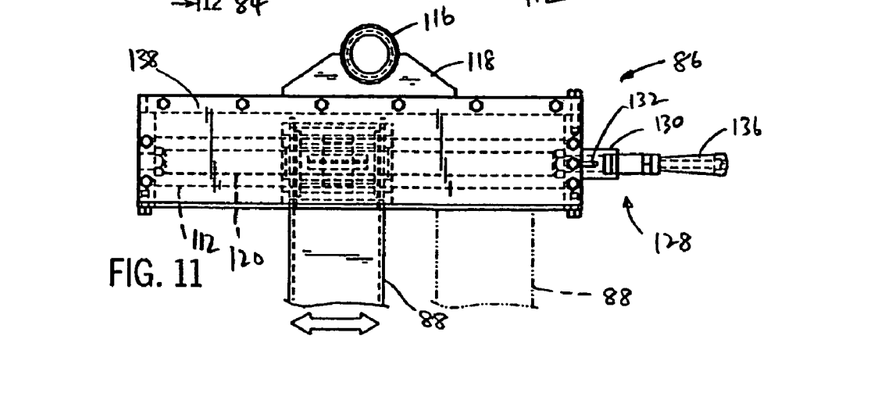
FIG. 11 is a top plan view of the variable position connection arrangement of FIGS. 9 and 10.

One end of adjustment screw 120, shown at 126, extends outwardly of the outer one of side plates 110. As shown in FIGS. 9–11, a handle assembly 128 is engaged with adjustment screw end 126, and includes a hub 130 engaged with adjustment screw end 126 via a cross pin 132, a crank arm 134 extending outwardly from hub 130, and a handle 136 pivotably mounted to the outer end of crank arm 134. Preferably, hub 130 is formed with slots adapted to receive the ends of cross pin 132, and hub 130 defines a passage within which adjustment screw end 126 is received, such that handle assembly 128 is removably engageable with adjustment screw end 126.

A cover, including a top wall 138 and a partial front wall 140, is engageable with the upper ends of rear plate 108 and side plates 110, for concealing adjustment screw 120 and the area of adjustment mechanism 86 above rake arm rear section 88.

In assembly, rake arm rear section 88 is engaged with guide rod 112 such that guide rod 112 extends through openings 98 in support side walls 96, and through transverse passage 94 in the rear end of rake arm rear section 88. A pair of rubber washers 142 are engaged with the walls of rake arm rear section 88 at each end of passage 94, for preventing dirt or other contaminants from entering passage 94. Adjustment screw 120 is threadedly engaged with threaded sleeve 104 secured to top cross member 102. In this manner, support 84 and the rear end of rake arm rear section 88 are slidable along guide rod 112 in response to rotation of adjustment screw 120, to vary the lateral position of rake arm 30 relative to adjustment mechanism 86, as discussed previously with respect to rake arm mounting mechanism 42.

A mounting bracket 144 (FIG. 14) is secured to vertical leg 106 of rear trolley or frame assembly 22. Mounting bracket 144 includes a pair of side plates 146, as well as top and bottom plates 148, 150, respectively. Side gusset plates 152 are located on either side of each of top and bottom plates 148, 150, respectively, and are interconnected with side plates 146, for reinforcing top and bottom plates 148, 150, respectively. Vertically aligned openings 154, 156 are formed in top and bottom plates 148, 150, respectively. Mounting bracket 144 is secured to vertical leg 106 in any satisfactory manner, such as by welding.

Figure 14:
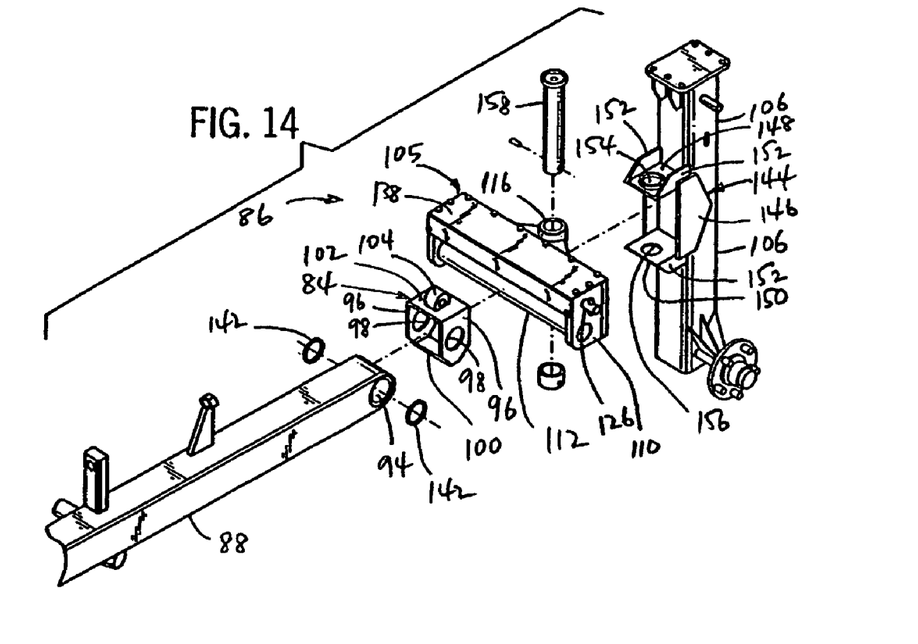
FIG. 14 is an exploded isometric view of the components of the variable position connection arrangement of FIGS. 7 and 8.

Adjustment mechanism 86 is pivotably mounted to rear frame assembly 22 by pivotably mounting adjustment mechanism 86 to mounting bracket 144. Upright pivot sleeve 116 is positioned between top and bottom plates 148, 150, respectively, of mounting bracket 144, such that the passage defined by upright pivot sleeve 116 is located between and in alignment with openings 154, 156 in top and bottom plates 148, 150, respectively. A vertical pivot shaft 158 extends through openings 154, 156 and pivot sleeve tube 116, such that the longitudinal axis of pivot shaft 158 defines the vertical or upright pivot axis about which adjustment mechanism 86 is pivotable relative to rear trolley or frame assembly 22. The pivot axis defined by pivot shaft 118 is substantially parallel to the longitudinal axis of vertical leg 106.

In operation, the user employs handle assembly 128 to adjust the position of rake arms 30 relative to adjustment mechanism 86, to adjust the width of a windrow formed by rake 20. In a fully open maximum width position, shown in FIG. 7, each rake arm 30 is positioned in an outwardmost location on its respective guide rod 112, to provide a maximum width of the windrow formed by rake 20. In a fully open minimum width position, shown in FIG. 8, each rake arm 30 is moved to its inwardmost position on its respective guide rod 112, to provide a minimum windrow width during operation of rake 20. As can be appreciated, rake arms 30 can be located at any desired position between the maximum width position and the minimum width positions, to enable the user to attain any desired windrow width.

Figure 13:
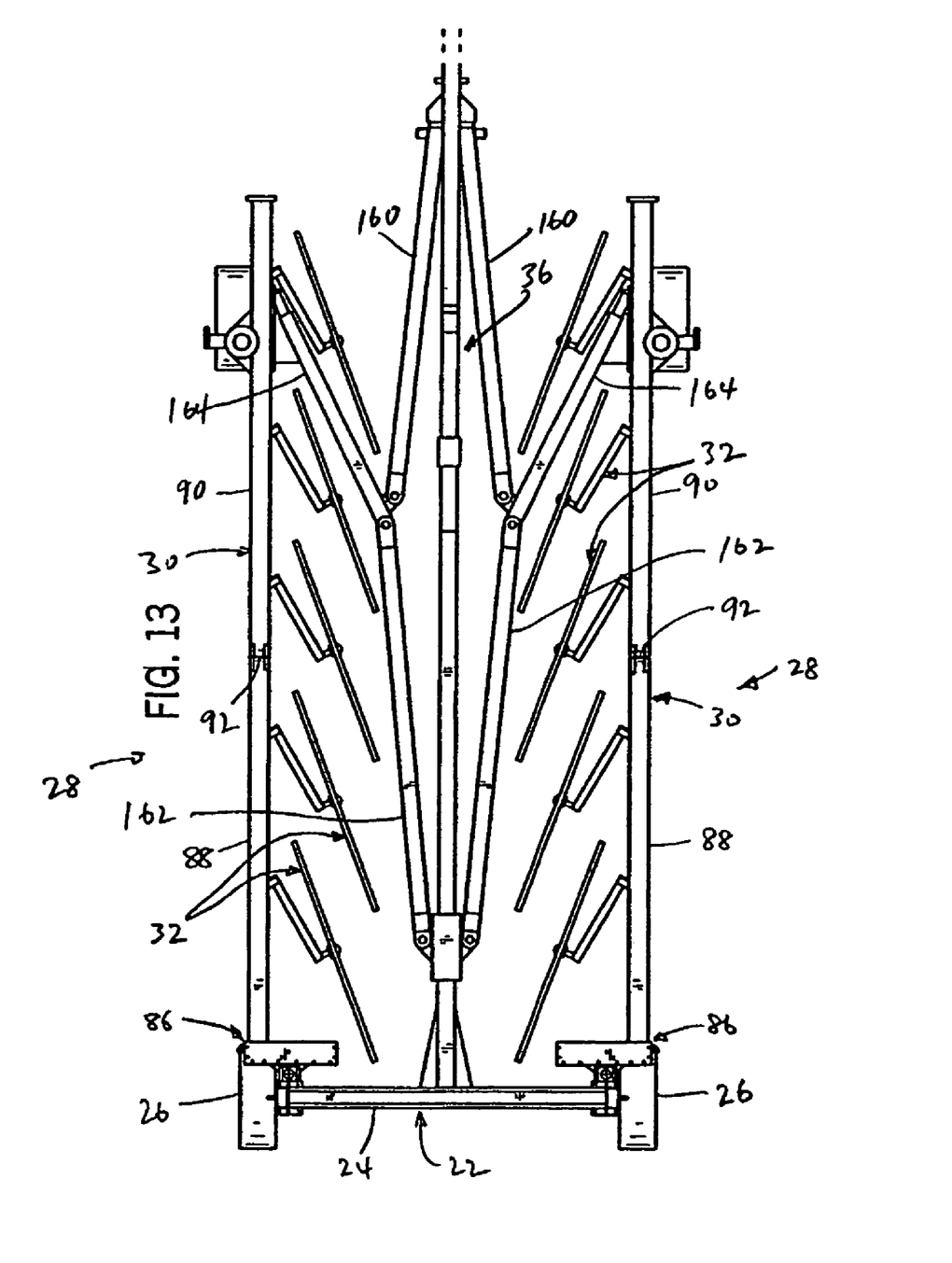
FIG. 13 is a top plan view of a V-rake incorporating the variable position connection arrangement of FIGS. 7 and 8, showing the rake in a transport position.

When it is desired to transport rake 20, the user operates each adjustment mechanism 86 so as to place rake arms 30 in their outwardmost positions, and the rake opening and closing mechanism is operated so as to draw rake arms 30 inwardly to a transport position as shown in FIG. 13. In this position, rake arms 30 are parallel to each other and extend forwardly from rear wheels 26.

The pivotable mounting of each adjustment mechanism 86 to vertical trolley leg 106 provides a number of advantages in construction and operation. For example, this feature enables each rake arm 30 to maintain a perpendicular relationship relative to its associated adjustment mechanism 86 regardless of the position of rake arm 30 on guide rod 112. Further, the pivot connection of each rake arm 30 relieves stresses on the connection of each rake arm 30 to rear trolley or frame assembly 22 which may be experienced by the fixed-position mounting of the prior embodiment, while still providing variability in the position of the rear ends of rake arms 30, to adjust windrow width.

Significantly, the vertical axis pivot connection between each adjustment mechanism 86 and rear trolley or frame assembly 22 enables each rake arm 30 to be pivotable relative to the adjustment mechanism 86 about a horizontal pivot axis, to allow rake arm 30 to pivot vertically so as to enable rake arms 30 to follow the contours of the ground. In the particular illustrated embodiment, the pivot axis is defined by each guide rod 112, which thus serves the dual function of guiding movement of the rearwardmost end of the rake arm 30 between its outwardmost and inwardmost positions, as well as serving as a horizontal pivot connection for enabling the associated rake arm 30 to pivot in a vertical direction. When this feature is employed in combination with the construction of rake arms 30 providing a rear section 88 and a forward section 90 interconnected via a hinge 92, which defines a pivot axis parallel to the pivot axis defined by guide rod 112, rake arm 30 is thus provided with an articulated, jointed construction which is capable of closely following ground contours.

In this version, as shown in FIG. 13, the rake opening and closing mechanism is in the form of a linkage mechanism including a pair of front arms 160, a pair of rear arms 162, and a pair of outboard actuating arms 164. Combination horizontal axis and vertical axis pivot connections are provided between the various arms 160, 162 and 164 so as to accommodate vertical movement of rake arms 30 relative to drawbar assembly 36.

FIGS. 16–19 illustrate another alternative embodiment of a windrow width adjustment mechanism in accordance with the present invention, and like reference characters will be used where possible to facilitate clarity. In this embodiment, V-rake 20' includes rear trolley or frame assembly 22 with wheels 26, and rake arms 30 pivotably mounted at their rearward ends to trolley or frame assembly 22. Fixed position rake wheel assemblies 32 are mounted to each rake arm 30, forwardly of a variable position rear rake wheel assembly 170 which is operable to vary the width of a windrow formed by rake 20'.

Figure 16:
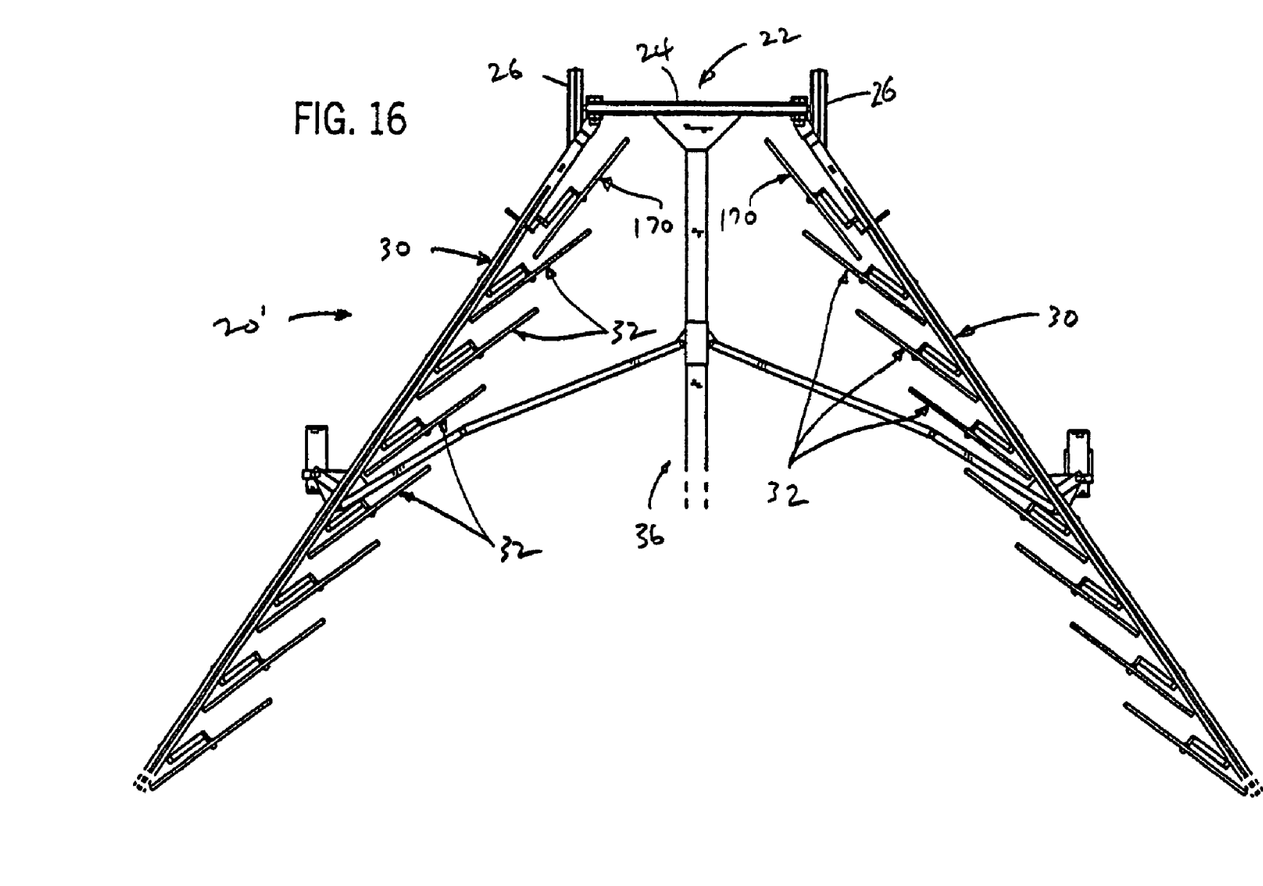
FIG. 16 is a top plan view of a V-rake incorporating an alternative embodiment of a windrow width adjustment mechanism in accordance with the present invention.
Figures 17, 18, 19:
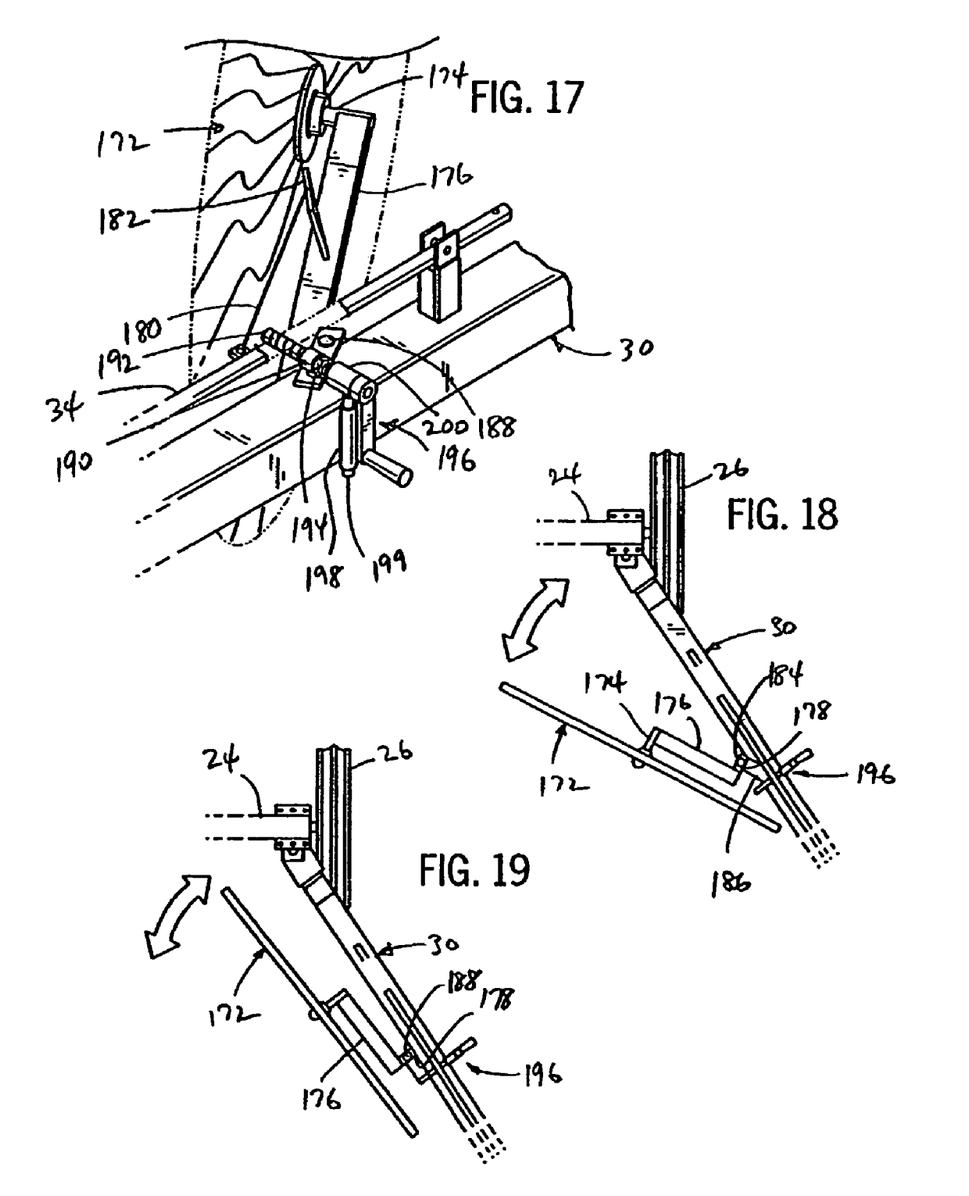
FIG. 17 is a partial isometric view of the components incorporated in the windrow width adjustment mechanism associated with the V-rake of FIG. 16.
FIGS. 18 and 19 are partial top plan views showing the rearwardmost rake assemblies in positions providing minimum and maximum windrow width, respectively, in the V-rake of FIG. 16.

Rear rake wheel assemblies 170 are movable inwardly and outwardly relative to rake arms 30 so as to vary the width of the windrow formed by operation of V-rake 20'. Each rear rake wheel assembly 170 includes a rear rake wheel 172 which is rotatably mounted to a rake wheel axle 174, which in turn is secured to one end of a lifting and lowering bar 176. At its opposite end, lifting and lowering bar 176 is mounted to a pivot shaft 178, which defines a vertical pivot axis about which lifting and lowering bar 176 is pivotable for moving rake 172 between its raised and lowered positions. In a known manner, a cable 180 extends between actuator rod 34 and an ear 182 which extends upwardly from lifting and lowering bar 176, for pivoting bar 176 about pivot shaft 178.

Pivot shaft 178 is connected to an upstanding sleeve 184, and a lever 186 extends from the upper end of sleeve 184. A fixed vertical pivot rod 188 extends through a vertical passage defined by sleeve 184, and rod 188 defines a vertical pivot axis about which rear rake wheel assembly 172 is pivotable. A receiver 190 is pivotably engaged with lever 186 at the end of lever 186 opposite sleeve 184. A threaded actuator rod 192 extends through receiver 190, and is threadedly engaged with a nut 194 secured to receiver 190. Actuator rod 192 is mounted to a crank-type handle assembly 196 which is pivotably mounted to rake arm 30 via a vertical axis pivot arrangement including a vertical sleeve 198, a rod 199 pivotably received within sleeve 198, and a horizontal sleeve 200 fixed to the upper end of rod 199 and through which actuator rod 192 extends. Handle assembly 196 is adapted for manual rotation by an operator, so as to cause rotation of actuator rod 192 about its longitudinal axis.

In operation, this embodiment of the invention is capable of adjusting the windrow width by operating handle assembly 196 so as to move rear rake wheel 172 toward and away from rake arm 30. To narrow the windrow width, the operator turns handle assembly 196 so as to draw nut 194 and receiver 190 outwardly, which causes outward movement of the end of lever 186 and counterclockwise movement of sleeve 184 on pivot rod 188. This functions to cause inward pivoting movement of pivot shaft 178 about the longitudinal axis of rod 188, to swing lifting and lowering bar 176 inwardly to a position as shown in FIG. 18, wherein rear rake wheel 172 is positioned at a greater angle relative to rake arm 30 than the rake wheels of the remainder of rake wheel assemblies 32. When rake 20 is moved along the ground and rear rake wheel 172 is positioned in this manner, rake wheel 172 functions to move crop material inwardly a distance greater than would occur if rake wheel 172 were positioned parallel to the remaining rake wheels, as in the prior art. Accordingly, this position of rear rake wheels 172 functions to narrow the width of the windrow.

To increase the windrow width, the user turns handle assembly 196 so as to move nut 194 and receiver 190 inwardly along the length of actuator rod 192. This causes the end of lever 186 to be moved inwardly, and to pivot sleeve 184 in a clockwise direction about pivot rod 188. Pivot shaft 178 is pivoted in a similar manner, to swing lifting and lowering arm 176 outwardly in a clockwise direction toward rake arm 30. Rear rake wheel assembly 170 can be moved to a position in which rear rake wheel 172 is positioned nearly parallel to rake arm 30, and past the point at which rear rake wheel 172 is parallel to the rake wheels of the remaining rake wheel assemblies 32. When rear rake wheel assemblies 170 are in this position, as shown in FIG. 16, movement of V-rake 20 along the ground causes rear rake wheels 172 to move the crop material a very small amount inwardly, if any, beyond that provided by the rake wheel of the next forward rake wheel assembly 32. Positioning rear rake wheel assemblies 170 in this manner thus functions to provide a windrow having a greater width than would be provided if rear rake wheels 42 were parallel to the remaining rake wheels.

As can be appreciated, handle assembly 66 may be rotated to any position so as to locate rear rake wheel 42 in any desired angular position between its maximum and minimum width positions as shown and described, to provide precise control of the windrow width.

It should be appreciated that the illustrated mechanism is but one manner of carrying out this aspect of the invention, which broadly contemplates movement of the rear rake wheel assembly to varying positions so as to vary the windrow width. Other types of rake wheel positioning devices and actuator mechanisms may be employed, such as a cylinder or motor-operated pivoting arrangement or the like.

With the present invention, the user is able to adjust windrow width without having to alter the overall width of rear trolley or frame assembly 22, as contemplated by the prior art, which typically involves a number of steps and which is relatively time consuming. Further, the structural and durability drawbacks of a variable width trolley are avoided by the present invention, which provides adjustment of windrow width independent of the trolley. The windrow width adjustment system according to any of the embodiments of the invention is capable of quickly and easily adjusting windrow width without the need for tools, which greatly facilitates windrow width adjustment by the operator.

The embodiments of the present invention as shown and described are understood to be illustrative ways of implementing windrow width adjustment in accordance with the invention. The invention contemplates any system for adjustably connecting the rearwardmost rake wheel or adjustably mounting the rake arms to the trolley or rear frame assembly. Various alternatives may be employed for accomplishing the objects of the invention. For example, and without limitation, a hydraulic cylinder could be employed to impart lateral movement to the rake arm mounting bracket assembly, in place of the screw-type actuators as shown and described. Further, lateral guiding movement of the rake arm mounting bracket in the former embodiments could be accomplished in any form, and is not limited to the frame and guide member embodiments as illustrated. For example, the mounting bracket assembly could be guided on the transverse frame member itself rather than on a separate assembly mounted to the transverse frame member, or other variations may be employed. With this particular embodiment, the adjustment mechanisms can be positioned outboard of the ends of the rear frame member, to allow the rake arms to be moved both outwardly and inwardly relative to the rear frame member ends, to provide a significant degree of adjustment in the position of the rake arms and thereby adjustment of the windrow width.

Various alternatives and embodiments are contemplated as being within the scope of the following claims particularly pointing out and distinctly claiming the subject matter regarded as the invention.

I claim:

1. A V-type rake, comprising:
   a rear wheeled frame assembly;
   a pair of rake arms pivotably interconnected with and extending forwardly from the rear frame assembly, wherein a series of rake members are mounted to each rake arm and wherein a pair of spaced apart rake members mounted one to each rake arm comprise a pair of innermost rake members; and
   a rake member position adjusting arrangement interposed between each rake arm and the innermost rake member mounted thereto for varying the distance between the innermost rake members, wherein the rake member position adjusting arrangement is operable to adjust windrow width by varying the spacing between the innermost rake members without varying the width of the rear frame assembly, wherein the rake member position adjusting arrangement comprises a pivot connection interposed between the innermost rake member and the rake arm, and an actuator arrangement for selectively moving the innermost rake member about the pivot connection.

2. The V-rake of claim 1, wherein the pivot connection includes a sleeve and wherein the actuator arrangement comprises a lever arm interconnected with the sleeve, wherein the sleeve is interconnected with the rake member for imparting movement to the rake member in response to movement of the actuating lever.

3. The V-rake, of claim 2, wherein the actuator arrangement includes a screw-type actuator engaged with the lever for moving the lever and the sleeve about the pivot connection.

4. In a rake assembly including a wheeled trolley, a pair of rake arms interconnected with the wheeled trolley and extending forwardly therefrom, and a series of rake members carried by each rake arm, wherein the rake arms and rake members are configured such that a pair of spaced apart innermost rake members are located toward the rearward ends of the rake arms, the improvement comprising a rake member position adjustment arrangement interposed between at least one of the rake arms and at least one of the rake members making up the pair of innermost rake members, for varying the position of the rake member relative to the rake arm so as to vary the width of a windrow formed by movement of the rake assembly along the ground, wherein the rake member position adjusting arrangement comprises a pivot connection interposed between the rake arm and the innermost rake member, and an actuator arrangement for imparting pivoting movement to the rake member about the pivot connection.

5. The improvement of claim 4, wherein the actuator arrangement includes a lever, an actuating screw interconnected with a handle assembly, and a lifting and lowering bar associated with the rake member, wherein operation of the handle assembly functions to cause pivoting movement of the lifting and lowering bar about the pivot connection for varying the angle of the rake member.

6. A method of adjusting the width of a windrow formed by a rake having a pair of spaced apart arms, each of which carries a series of rake members, wherein the arms and the rake members are oriented such that a pair of innermost rake members define the width of a windrow, comprising the step of altering the position of at least one of the rake members relative to its respective arm by pivoting the rake member about a pivot connection interposed between the rake member and the rake arm so as to adjust the spacing between the innermost rake members.

7. The method of claim 6, wherein the step of pivoting the rake member about the pivot connection is carried out using an actuator arrangement that acts on the rake member to pivot the rake member about the pivot connection.

8. The method of claim 7, wherein the pivot connection includes a sleeve and wherein the actuator arrangement comprises a lever arm interconnected with the sleeve, wherein the step of pivoting the rake member about the pivot connection is carried out by imparting movement to the rake member through the sleeve in response to movement of the actuating lever.

9. The method of claim 8, wherein the actuator arrangement includes a screw-type actuator engaged with the lever, and wherein the step of pivoting the rake member about the pivot connection is carried by moving the lever and the sleeve about the pivot connection using the screw-type actuator.

* * * * *